(12) United States Patent
Lee (10) Patent No.: US 7,610,284 B2
(45) Date of Patent: Oct. 27, 2009

(54) COMPRESSED PREFIX TREES AND ESTDEC+ METHOD FOR FINDING FREQUENT ITEMSETS OVER DATA STREAMS

(75) Inventor: Won Suk Lee, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 145 days.

(21) Appl. No.: 11/604,368

(22) Filed: Nov. 27, 2006

(65) Prior Publication Data

US 2007/0198548 A1 Aug. 23, 2007

(30) Foreign Application Priority Data

Nov. 28, 2005 (KR) ................. 10-2005-0113919

(51) Int. Cl.
*G06F 7/00* (2006.01)
(52) U.S. Cl. ............................................ 707/6; 707/7
(58) Field of Classification Search ................ 707/1–10
See application file for complete search history.

(56) References Cited

U.S. PATENT DOCUMENTS

| | | | | |
|---|---|---|---|---|
| 6,138,117 | A * | 10/2000 | Bayardo ....................... | 707/6 |
| 6,415,287 | B1 * | 7/2002 | Wang et al. .................... | 707/6 |
| 6,473,757 | B1 * | 10/2002 | Garofalakis et al. ........... | 707/6 |
| 2003/0217055 | A1 * | 11/2003 | Lee et al. ....................... | 707/6 |
| 2004/0181519 | A1 * | 9/2004 | Anwar ........................... | 707/3 |
| 2006/0174024 | A1 * | 8/2006 | Chi et al. ....................... | 709/231 |

OTHER PUBLICATIONS

Charikar, et al., "Finding Frequent Items in Data Streams", Proc. 29th Int'l Colloq. Automata, Language and Programming, pp. 1-11, (2002).
Brin, et al., "Dynamic Itemset Counting and Implication Rules for Market Basket Data", Proc. ACM SIGMOD Int'l Conf. Management of Data (SIGMOD 97), pp. 255-264, (1997).
Chang, et al., "Finding Recent Frequent Itemsets Adaptively over Online Data Streams", In Proc. Of the 9th ACM SIGKDD Int'l Conf. on Knowledge Discovery and Data Mining, Washington, DC, (CIKM 01), pp. 487-492, (2001).
Hafez, et al., "The Item-Set Tree: A Data Structure for Data Mining", In Proc. Of 1st Int'l Conf on datawarehousing and knowledge discovery, pp. 183-192, (Aug. 1999).
Zaki, et al., "Generating Non-Redundant Association Rules", Proc. 6th ACM SIGKDD Int'l Conf. Knowledge Discovery and Data Mining (KDD 00), pp. 1-18, (2000).

* cited by examiner

*Primary Examiner*—Wilson Lee (57) ABSTRACT

The present invention provides an effective data structure in finding frequent itemsets over data streams and finds necessary information using the data structure. The data structure proposed in the present invention is defined as a compressed prefix tree structure, and the compressed prefix tree merges or splits nodes during the mining operation by comparing the prefix tree structure applied to the conventional data mining to manage a plurality of items in a single node, thus dynamically and flexibly adjusting the tree size. Such dynamic adjustment function dynamically merges and splits nodes in the prefix tree, if the variation of itemsets that are most likely to be frequent itemsets due to the variation of the data stream, thus maximizing the accuracy of the mining result in a restricted memory space, i.e., the accuracy of frequent itemsets found.

7 Claims, 5 Drawing Sheets

COMPRESSED PREFIX TREES AND ESTDEC+ METHOD FOR FINDING FREQUENT ITEMSETS OVER DATA STREAMS

CROSS-REFERENCE TO RELATED APPLICATION

This application claims the benefit of Korean Patent Application No. 10-2005-0113919, filed on Nov. 28, 2005, the entire disclosure of which is hereby incorporated by reference.

BACKGROUND OF THE INVENTION

1. Field of the Invention

The present invention relates to a method for finding specific information by analyzing a large amount of data sets and a method for finding frequent itemsets in a data mining system realized using the same and, more particularly, to a method for finding a support in real time defined by the ratio of a transaction, in which a specific itemset appears, to the total number of transactions constituting a data set using a value indicating the ratio of a frequency count of the corresponding itemset in the total data sets to a frequent itemset having a frequency count larger than a support threshold defined previously in an indefinite data set (hereinafter, referred to as "a data stream") that continuously accumulates data newly generated as time goes by.

2. Description of Related Art

In a data set that is an object of data mining, a unit information that appears in an application is generally defined as an item, and a group of unit information that has a significant concurrency in the application (i.e., significantly appears at the same time) is defined as a transaction. The transaction includes information of items having a significant concurrency and the data set that for the data mining is defined as a set of transactions that appear in the corresponding application.

Conventional methods for finding frequent itemsets aim at defining data sets fixed at the point of time of data mining analysis and finding frequent itemsets in the fixed data sets. Since these conventional methods define the data sets fixedly, only the information accumulated at a specific point of time is the object of the data mining analysis. However, since the information included in transactions newly generated as time goes by may be changed and, further, the mining result for newly generated data sets may cause a problem of availability in the near future if new data are generated continuously, it is necessary to carry out the mining operation again for the total data sets including the data sets of the previous mining objects and the new transactions generated subsequently in order to obtain an accurate result covering the newly generated data sets. In general, since the mining operation using the conventional mining method requires longer time for operation and much more capability in computer process if the data sets are larger, it can not provide the mining result in real time.

An operation of finding frequent itemsets is to find all itemsets, of which the ratio of the number of transactions, in which itemsets appear, to the total number of the transactions in an indefinite data set has a support larger than a specific support threshold. For finding frequent itemsets under the circumstances that the data sets are increased intermittently, it is required to apply incremental mining methods. Among various data structures proposed for finding frequent itemsets, as a method of reducing the memory usage for the incremental mining, an itemset tree structure disclosed in "A. Hafez, J. Deogun, and V. V. Raghavan, The Item-Set Tree: A data Structure for Data Mining, In proc. Of 1st int'l conf on datawarehousing and knowledge discovery, pages 183~192, August 1999", basically sets and manages the total transactions in a node. If a new transaction is generated, the itemset tree is generated through the following two steps. The first step is to generate a node for a new itemset and the second step is to update the frequency counts of nodes to be updated by the new itemset. When searching the tree to generate a node for a new itemset, if a common itemset is found by comparing the nodes that constitute a node of the itemset tree with the itemsets generated by a newly generated transaction, the common itemset is shared as an upstream node and the other itemsets are generated as downstream nodes. Since the respective nodes in the itemset tree structure manage the exact frequency counts, the frequency counts are updated by searching the whole tree in the second step. The itemset tree can reduce the memory usage effectively by sharing the nodes in processing a large amount of data. However, since it should search the whole tree to update the frequency counts of the respective nodes, it requires longer time for the process. Moreover, since it should accumulate the information on all transactions generated in memory, it has no function of dynamically adjusting the size of the itemset tree. Due to such drawbacks, the itemset tree structure is not suitable for the method of finding frequent itemsets over an online data stream that requires mining results in real time.

Methods for finding frequent itemsets over data streams include Count Sketch algorithm proposed in "M. Charikar, K. Chen, and M. Farach-Colton, Finding Frequent Items in Data Streams, Proc. 29th Int'l Colloq. Automata, Language and Programming, 2002" and Lossy Counting algorithm proposed in "G. S. Manku and R. Motwani, Approximate Frequency Counts over Data Streams, Proc. 28th Int'l Conf. Very Large Data Bases (VLDB 02), 2002". However, these two algorithms include some errors in the frequent itemsets or the frequency counts acquired as mining results, since it is impossible to maintain the information of all transactions generated previously. The Count Sketch algorithm focuses on finding frequent itemsets over data streams. The Count Sketch algorithm generates a set of items that satisfy the threshold or more by estimating the frequency counts of the items in the transactions generated up to now. On the contrary, the Lossy Counting algorithm finds the frequent itemsets generated in the data stream, if there are given a minimum support and a maximum allowable error. The respective transactions generated in the data stream are filled in buffers of a fixed size maintained in main memory and batch processed in the unit of the buffer, and the management structure of the frequency counts of the respective itemsets is maintained in an auxiliary device. The frequency counts of the items are updated for the transactions filled in the buffers, and a new possible frequent itemset is also managed by estimating the maximum error to be contained in the corresponding itemset by considering the number of transactions generated previously. The Lossy Counting algorithm is influenced by the size of the buffer. If the size of the buffer is set large, it is possible to batch process a large amount of transactions, thus reducing the number of data operations. However, since it requires a large memory usage, it is necessary to adjust the size of the buffer appropriately. Although the Lossy Counting algorithm includes some errors in mining results, it can reduce the memory usage and find results with one search during the mining process, which is useful for the data stream mining. However, since the Lossy Counting algorithm processes in the unit of the buffer, it is inefficient over an online data stream for obtaining mining results promptly at a certain point of time.

An estDec method for finding frequent itemsets over online data streams, disclosed in "J. H. Chang, W. S. Lee, Finding recent frequent itemsets adaptively over online data streams, In Proc. Of the 9th ACM SIGKDD Int'l Conf. on Knowledge Discovery and Data Mining, Washington, D.C., August 2003. (CIKM 01), pp. 263-270, 2001", has a difference from the Lossy Counting algorithm in view of the fact that the transactions constituting a data stream are generated and processed simultaneously. The estDec method uses a prefix lattice tree, proposed in "S. Brin, R. Motwani, J. D. Ullman, and S. Tsur, Dynamic Itemset Counting and Implication Rules for Market Basket Data, Proc. ACM SIGMOD Int'l Conf. Management of Data (SIGMOD 97), pp. 255-264, 1997" and "M. J. Zaki, Generating Non-Redundant Association Rules, Proc. 6th ACM SIGKDD Int'l Conf. Knowledge Discovery and Data Mining (KDD 00), pp. 34-43, 2000", and manages only itemsets that are likely to be frequent itemsets through delayed insertion and pruning operations using the prefix lattice tree in memory. In the estDec method, the itemset that appears in the data stream is managed in the prefix tree in memory in the following two cases: First, an itemset of 1 in length is inserted into the prefix tree unconditionally and managed. Second, if a new itemset of $n(n \geq 2)$ in length is generated and it is a significant itemset having a large support to the extent that the corresponding itemset becomes a frequent itemset in the near future, the itemset is inserted into the corresponding prefix tree. That is, the support of the itemset that are not a significant itemset so far is estimated from the subitemsets of the corresponding itemset and, if the estimated value is greater than a predefined delayed insertion threshold, it is inserted into the prefix tree (delayed insertion). Meanwhile, if the support of the itemset that is already managed in the prefix tree is decreased below a pruning threshold at a certain point of time, the corresponding itemset is determined as a minor itemset that is unlikely to be a frequent itemset and removed from the prefix tree in memory (pruning). Through the two operations (delayed insertion and pruning), the size of the prefix tree is reduced for the management of the frequency counts of the itemsets. An additional characteristic of the estDec is to let newly generated transactions to be reflected sufficiently on the mining results by giving different weights to transactions of the data stream indefinitely increased based on the generation times of the transactions.

The conventional researches have been introduced for finding frequent itemsets; however, they have the following technical limitations.

Limitations in the Basic Mining Method

The conventional methods have been designed to efficiently acquire mining results by predefining the data sets to be mined prior to the data mining process in the case where a basic statistical pre-processing analysis for the data sets is available. However, under the circumstances that the items that constitute a data set may be changed and the data sets are increased continuously, it is impossible to definitely define the items constituting the data set and the transactions thereof and, accordingly, it is impossible to carry out the basic statistical pre-processing analysis for the data sets.

The conventional mining systems aim at providing analyzed information for fixed data sets. Accordingly, it cannot provide the new changes caused by the changes of the data sets with the addition of new data to users promptly.

Limitations in Decreasing Time for Mining Process and the Real Time Process

The conventional methods require long processing times to obtain analysis results including newly generated information over the data sets increased continuously. That is, if the data sets are expanded under the circumstances that new transactions are generated continuously, the previous analysis results become the past information and their worth as recent information including the whole data sets generated up to now is decreased. Accordingly, to acquire a recent analysis result including newly generated data sets, the mining process should be carried out again for a portion or the whole of the previous data sets and for all newly generated transactions. That is, it has some drawbacks in that the mining process should be performed repeatedly and the corresponding data sets become larger, thus prolonging the processing time.

The conventional methods have the limitations in obtaining mining results in real time. The real time processing capability denotes a capability of acquiring an analysis result promptly within a given time period. The conventional methods pay regard only to the accurate information analysis for the data sets to be analyzed, thus having limitations in ensuring a prompt processing time. In particular, the conventional methods should accumulate all previous transactions separately under the circumstances that the data sets are continuously increased to read repeatedly the respective transactions constituting the data set. Moreover, since the processing time for obtaining a mining result including information of newly generated data sets is increased, they have been limitations in obtaining analysis results in real time. That is, since the conventional methods have been designed to obtain mining results based on the addition of newly generated transactions through an analysis for the whole data sets, they cannot provide mining results based on the addition of new transactions in real time.

Limitations in the Process Using a Limited Memory Space

The conventional methods can predict the memory usages required for the mining process in order to find frequent itemsets over a limited memory space, on the assumption that the data sets to be mined are predefined. However, in the real time mining over data streams, the data sets are not predefined and further it is impossible to predict the memory usage since the data sets are continuously increased.

The conventional mining methods over data streams store summary information for data sets in memory using various data structures such as tree and utilize the summary information for finding frequent itemsets. The estDec prefix tree and the Loss Counting's management structure of the frequency counts of itemsets are directed to the data structure storing and managing the summary information. Accordingly, if the amount of the summary information stored during the mining process exceeds a given memory space, it is impossible to proceed with the mining operation in memory.

SUMMARY OF THE INVENTION

The present invention has been contrived to solve the above described drawbacks in the conventional methods and, an object of the present invention is to provide a data structure that can provide an optimum accuracy over the change of a data stream even in a limited memory space through a flexible adjustment function of dynamic memory usage in a method for finding frequent itemsets, one of the data mining methods, in order to satisfy the changes in the application environment and its requirements.

To accomplish the objects of the present invention, there is provided a method for finding frequent itemsets using a compressed prefix tree structure that manages information on an indefinite data set composed of transactions generated continuously in an application domain and formation on itemsets generated in the transactions of the indefinite data set with a single node in a restricted memory space.

Moreover, the compressed prefix tree comprises four entries including an item list, a parent item list, a maximum frequency count that is a frequency count of a minimum itemset that the first item of the item list indicates, and a minimum frequency count that is a frequency count of a maximum itemset that the last item of the item list indicates.

Furthermore, the compressed prefix tree further comprises: a first step of adjusting the size of the restricted memory space to make the most use of the restricted memory space and reducing errors; a second step of updating a frequency count of an itemset generated in a transaction of a data stream and monitored; and a third step of inserting an itemset, which is not managed and likely to be a frequent itemset as the itemset appears in many transactions repeatedly, into a new itemset.

In addition, the above first step varies the size of the restricted memory space to make the most use of the restricted memory space, thus reducing errors generated in the process of estimating a frequency count of a merged itemset.

Moreover, the above second step finds a node based on a depth first finding method, updates the maximum frequency count of the node when a transaction is generated in the minimum itemset of the node, and updates the minimum frequency count of the node when a transaction is generated in the maximum itemset of the node.

Furthermore, the above second step further comprises the steps of: merging two independent nodes, if a support difference is less than a predefined merging gap threshold, to update a frequency count of an itemset in a newly generated transaction in a data stream; and splitting nodes, if a support difference in a plurality of itemsets managed in a single node exceeds the merging gap threshold.

In addition, the above step of merging nodes defines a merging threshold having a value greater than a minimum support to preclude a node that indicates an itemset having a support less than the merging threshold.

Moreover, the above step of splitting nodes further comprises the step of estimating a frequency count of an itemset other than a minimum itemset and a maximum itemset, if a node indicates at least three different itemsets, using a maximum frequency count, a minimum frequency count and an estimation function.

Furthermore, the estimation function estimates a frequency count, assuming that the decreased amount of frequency count according to the increase in length of an itemset is fixed.

In addition, the estimation function estimates a frequency count, assuming that the decreased amount of frequency count according to the increase in length of an itemset becomes smaller as much as the length of the itemset is increased.

DETAILED DESCRIPTION OF THE INVENTION

Hereinafter, preferred embodiments of the present invention will now be described in detail with reference to the attached drawings.

An object of the present invention is to provide a method for finding frequent itemsets, of which the ratio of the frequency count to the total number of transactions is greater than a user defined threshold in itemsets generated through an analysis of a data set, using a mining method for extracting in real time a result of finding frequent itemsets including new transactions under the circumstances of a data stream defined as an indefinite data set continuously expanded. A data set for finding frequent itemsets in the data stream mining is defined as follows.

□)□=$\{i_1, i_2, \ldots, i_n\}$ is a set of items up to now and the item denotes a unit information generated in an application domain.

□) If $2^\square$ denotes a power set of an itemset □, e satisfying an equation of e □ ($2^\square - \{\emptyset\}$) is defined as an itemset, the length |e| of an itemset denotes the number of items constituting an itemset e, and any itemset e is defined as |e|-itemset based on the length of the corresponding itemset. Generally, 3-itemset {a,b,c} is expressed simply by abc.

□) A transaction is not an empty set, not a subset of □, and each transaction has a transaction identifier TID. A transaction inserted to a data set in the order of k is expressed as $T_k$ and the TID of $T_k$ is k.

□) If a new transaction $T_k$ is inserted thereto, the current data set $D_k$ is composed of all transactions generated and inserted up to now, i.e., $D_k = <T_1, T_2, \ldots, T_k>$. Accordingly, $|D|_k$ denotes the total number of transactions contained in the current data set $D_k$.

If $T_k$ is the current transaction, the current frequency count for any itemset e is defined as $C_k(e)$, which represents the number of transactions including e in k transactions up to now. Like this, the current support $S_k(e)$ of itemset e is defined as the ratio of the frequency count $C_k(e)$ of itemset e to $|D|_k$, the total transactions up to now. If the current support $S_k(e)$ of itemset e is greater than a predefined minimum support $S_{min}$, the itemset e is defined as a frequent itemset in the current data stream $D_k$.

In the estDec method proposed in "Method and instrument for finding frequent items and frequent sequential patterns in real time in transaction data sets generated continuously" over online data streams, the transactions constituting a data stream are generated and processed at the same time, and the frequency counts of itemsets that appear in the transactions are managed using a monitoring tree having a prefix tree structure without any candidate set generation for the generation of frequent itemsets. If the current data set $D_k$ is given, the prefix tree $P_k$ has the following characteristics.

1. $P_k$ has a root node r having a value of "null", and the other nodes except r have an item i □ □.

2. Node n having an item $i_k$ manages the frequency counts μ of itemsets $i_1, i_2 \ldots i_k$ ($i_k$ □ □, k≧1) of items that the nodes in a path from the root node to its node r→$i_1$→ . . . $i_k$ ($i_k$ □ □, k≧1) have.

Figure 2:
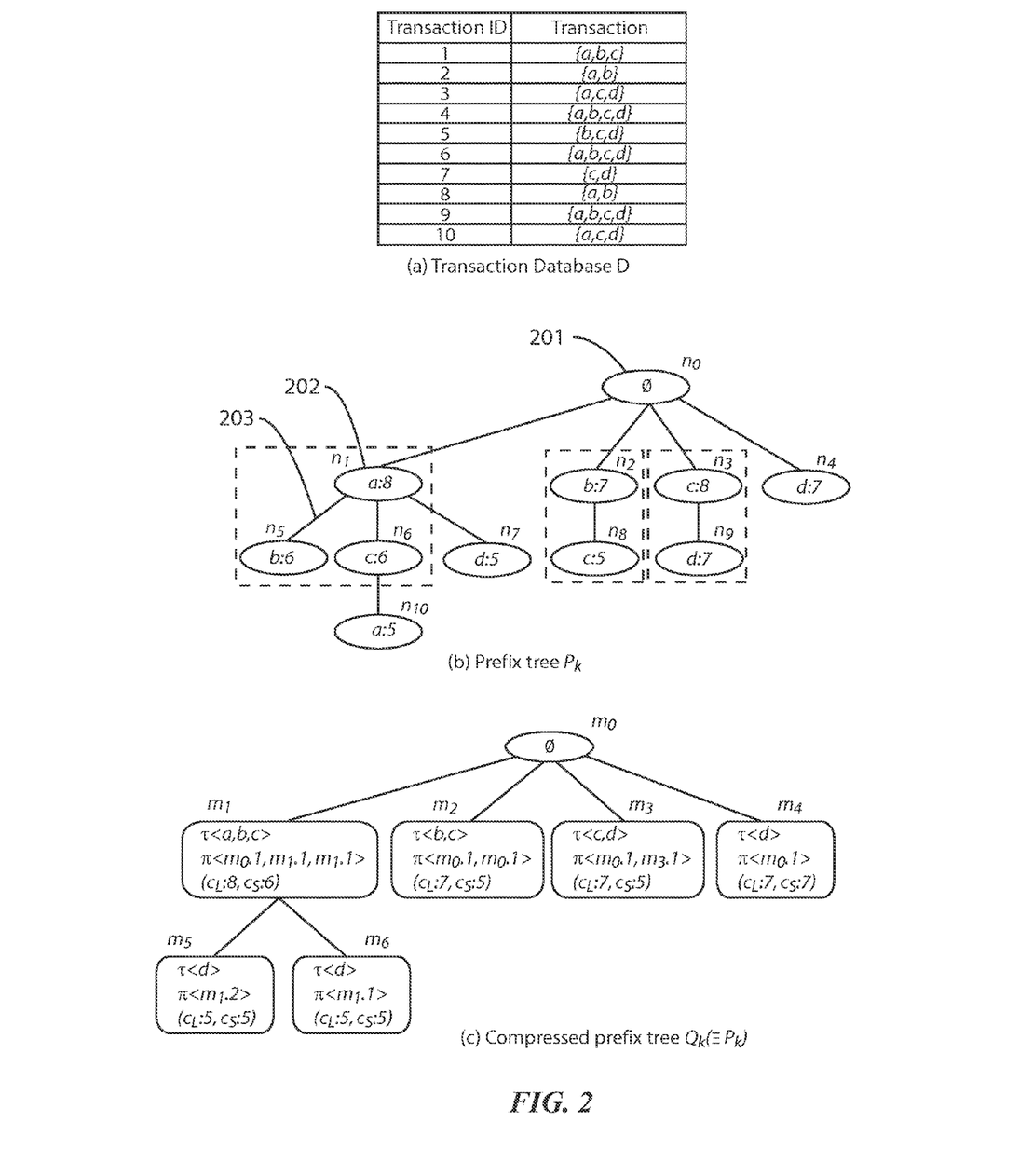
FIG. 2 depicts examples of a transaction database for configuring a prefix tree and a compressed prefix tree structure, a prefix tree structure used for finding frequent itemsets in the conventional data stream, and a process of configuring an equivalent compressed prefix tree structure from the prefix tree structure.

The estDec method stores information on the itemsets to be generated from transactions in memory using a prefix tree structure of FIG. 2-(b). The prefix tree is composed of an itemset, a node 201 managing the frequency count of the itemset and a link 202 linking a node to its child nodes. The nodes of the prefix tree are composed of itemsets representing a unique path from the root node to its node and store the frequency counts of itemsets represented by the path to the respective nodes. In a method for finding frequent itemsets using a prefix tree, if the number of the itemsets to be managed is increased as the itemsets having a high support are generated in quantities, the size of the prefix tree is sharply increased, thus increasing the memory usage during the process of finding frequent itemsets. Accordingly, if the required memory space exceeds the given memory space with the increase of the memory usage during the process of finding frequent itemsets, the operation of finding frequent itemsets can no longer proceed. The present invention defines a compressed prefix tree that can dynamically adjust the size of the tree to be suitable for the number of itemsets to be managed, thus solving the drawback of the prefix tree. The compressed prefix tree supports a function of merging and managing the similar itemsets and those having similar frequency counts among the itemsets generated in the data stream and flexibly reduces the memory space for finding frequent itemsets if necessary.

1. Definition and Structure of Compressed Prefix Tree

While a node of the prefix tree denotes an itemset, a node of the compressed prefix tree at least one itemset. Two consecutive nodes in parent-child relationship are merged into a node and managed if the support difference of the itemsets managed in the two nodes is less than a predefined merging gap threshold δ □ (0, 1). To this end, it is possible to adjust the number of nodes of the compressed prefix tree flexibly based on the δ value. The detailed structure of CP-node constituting the compressed prefix tree will now be defined as follows.

[Definition of CP-Node]

In a subtree S of a prefix tree $P_k$ generated by a data stream $D_k$, if the support difference of all itemsets that the respective nodes of S indicate, except for an itemset e, that a root node r(r □ S) denotes and the root node, is within a predefined merging gap threshold δ, that is, if $|C_k(e_r) - C_k(e_n)|/|D|_k \leq \delta$ for □n □ S, n≠r, all nodes of S can be merged into a node m at the compressed prefix tree $Q_k$ that is equivalent to $P_k$ and the following four entries (T, TT, $C_S$, $C_L$) are maintained in the node m of the compressed prefix tree $Q_k$ to shortly indicate the information of subtree S.

Item list T: This includes nodes existing from high level of subtree S to low level in the order from left to right. T[k] indicates the $k^{th}$ item of T. The number of items |T| in T is the same as nodes of subtree S that m denotes.

Parent item list TT: TT[k] denotes an index of T in which items that belong to a parent node of a node corresponding to T[k] in S are located. If a parent item $i_p$ of m·T[k] is $i_p$ □ m·T and m·T[j]=$i_p$ (1≦j<k), it is expressed by TT[k]=m·j. Supposed that $m_p$ is a parent node of m, if $i_p$ satisfies $i_p$ □ $m_p$·T and $m_p$·T[j]=$i_p$ (1≦j≦|$m_p$·T|), it is represented by TT[k]=$m_p$·j.

Maximum frequency count $c_S$: This denotes a frequency count $C_k(e_r)$ of an itemset that the root node r of subtree S indicates and this itemset is defined as a minimum itemset and expressed by $e_S$.

Minimum frequency count $C_L$: This denotes a frequency count of an itemset that the most right node of the lowest level of subtree S indicates, i.e., the itemset composed of the great number of items and corresponding to the last one in the order of items. This itemset is defined as a maximum itemset and represented by $e_L$.

FIG. 2 depicts examples of a prefix tree $P_k$ generated by a transaction database D shown in (a) and a compressed prefix tree $Q_k$ that is equivalent to $P_k$, if $S_{min}$=0.5, δ=0.2. To briefly indicate the tree, the expression of the itemsets that have a support less than $S_{min}$ is omitted. Since the support difference between an itemset a that a root node $n_1$ denotes and itemsets of ab and ac that its child nodes $n_5$ and $n_6$ of $n_1$ denote is within a predefined merging gap threshold δ=0.2, the subtree S composed of nodes $n_1$, $n_5$ and $n_6$ of the prefix tree $P_k$ is compressed to a node $m_1$ of $Q_k$, and the structure of the subtree S is reflected by item lists $m_1$·T=<a, b, c> and $m_1$·TT=<$m_0$·1, $m_1$·1, $m_1$·1>. The root node $n_1$ of the subtree S is represented by the first item $m_1$·T[1] of the item list T of $m_1$, a parent node of $n_1$ is identified as a node $m_0$ of $Q_k$ by $m_1$·TT[1]=$m_0$·1. Likewise, it can be analogized that a parent node of a node $n_2$ is $n_1$ from $m_1$·T[2]=b corresponding to $n_2$ and $m_1$·TT[2]=$m_1$·1 that denotes a parent item of item b is $m_1$·T[1]=a. It can be learned from [Definition of CP-node] that the minimum itemset and the maximum itemset of $m_1$ are a and ac, respectively, and $C_L$ and $C_S$ maintain the current frequency counts of a and ac. Similarly to the process of compressing the subtree composed of nodes of $n_1$, $n_5$ and $n_6$ of $P_k$, nodes $n_2$ and $n_8$ are compressed to a node $m_2$ of $Q_k$ and nodes $n_3$ and $n_9$ are compressed to a node $m_3$ of $Q_k$. On the contrary, nodes $n_4$, $n_7$ and $n_{10}$ are converted into nodes $m_4$, $m_5$ and $m_6$ of $Q_k$ without the compressing process, since they do not satisfy the merging conditions as set forth in [Definition of CP-node].

2. Frequency Count Estimation of a Merged Itemset

The respective nodes of the compressed prefix tree manage only the frequency counts of two itemsets in maximum. Accordingly, if more than three itemsets are merged into a node m, the frequency counts of itemsets other than $e^S$ and $e_L$ are estimated from m·$c_L$ and m·$C_S$. If an item list of the node m is given as m·T=<$i_1, i_2, \ldots, i_n$>, the frequency count of an itemset $e_{i_k}$ expressed by any item $i_k$ (1<k<n) in the list can be obtained as follows.

If f(m, k) is regarded as a frequency count estimation function for estimating the difference of the frequency counts of $e_{i_1}$ and $e_{i_k}$, the frequency count of $e_{e_k}$ is obtained by $C(e_{i_k})$=[m·$c_L$−f(m,k)]. Here, the estimation function f(m, k) can be defined as various forms in consideration of characteristics of the data set. In the present invention, the following two estimation functions are defined. One is to assume that the decreased amount of the frequency count according to the increase in length of an itemset is fixed and the estimation function is expressed by $f_1$(m, k). The other is to assume that the decreased amounts of the frequency count according to the increase in length of an itemset becomes smaller as much as the length of the itemset is increased and the estimation function is defined as $f_2$(m, k).

$$f_1(m, k) = (mc_L - mc_S) \times \frac{|e_{i_e}| - |e_s|}{|e_L| - |e_s|}$$

$$f_2(m, k) = (mc_L - mc_s) \times \left( \sum_{i=1}^{|e_{i_e}| - |e_s|} \frac{1}{j} \bigg/ \sum_{i=1}^{|e_L| - |e_s|} \frac{1}{j} \right)$$

The frequency counts of itemsets managed in the compressed prefix tree contain estimation errors in some degree due to the estimation process of the frequency counts of itemsets, and the range of the estimation errors is influenced by the merging gap threshold $\delta$. Since the greater $\delta$ is, the more nodes are merged and managed, the size of the compressed prefix tree is reduced, whereas, the estimation errors generated in the process of estimating the frequency counts of itemsets become greater. However, the errors that may be included in the estimated frequency counts are restricted within $\delta$.

3. Finding Frequent Itemsets Using Compressed Prefix Tree

Figure 3:
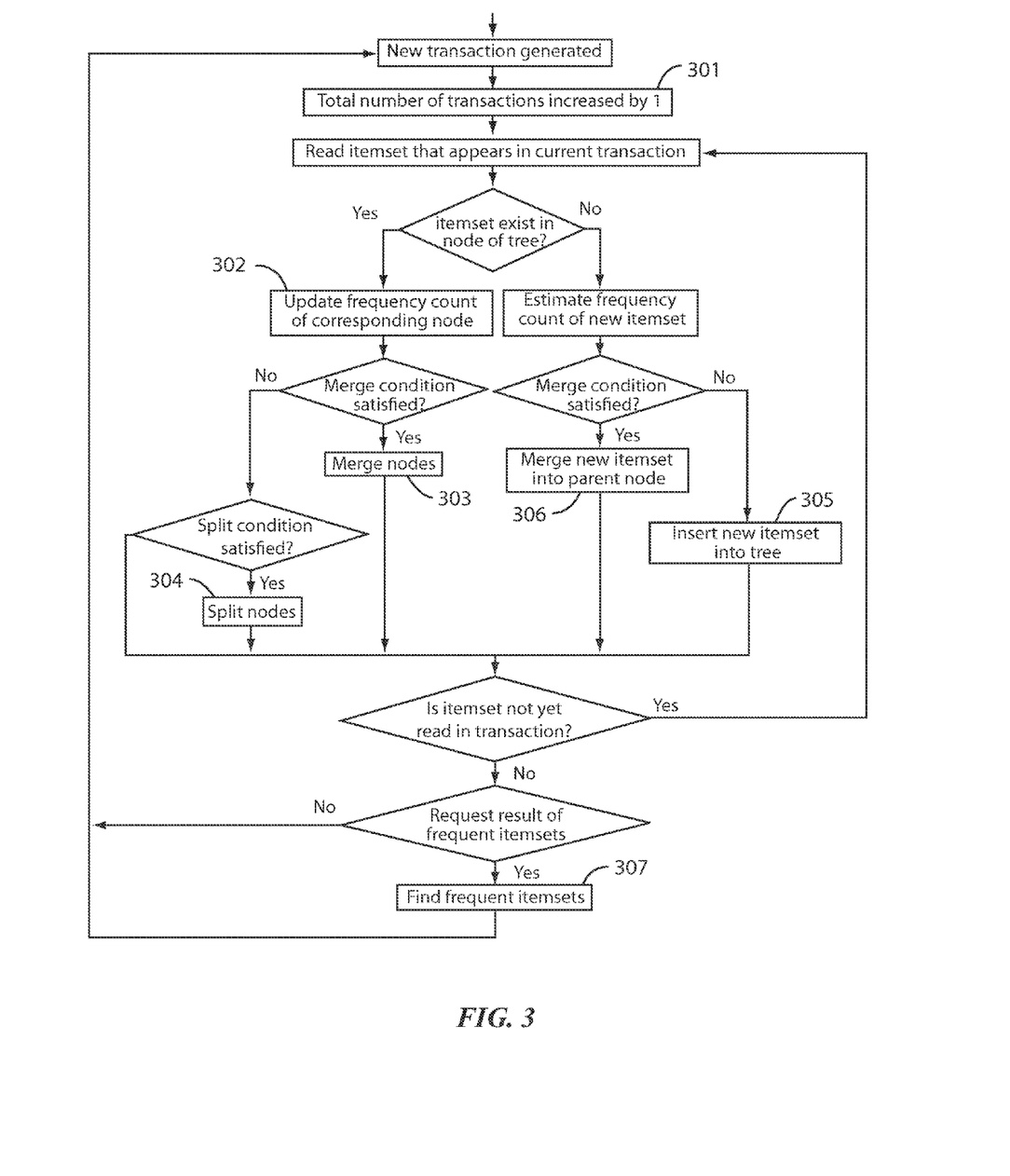
FIG. 3 is a flowchart for illustrating the step of configuring a compressed prefix tree and finding frequent itemsets using the compressed prefix tree.

FIG. 3 shows the process of configuring a compressed prefix tree from data sets generated over a data stream and finding frequent itemsets using the compressed prefix tree. The compressed prefix tree is used effectively in the case where the variation of frequent itemsets to be stored in a limited memory space over an online data stream is great. A method for finding frequent itemsets using a compressed prefix tree is designed by improving the estDec method proposed in the previous studies and is called an estDec+.

The estDec+ method performs delayed insertion and pruning operations like "Method and instrument for finding frequent items and frequent sequential patterns in real time in transaction data sets generated continuously". Through such operations, only significant itemsets that may become frequent itemsets in the near future are managed in memory. However, the estDec+ method manages the frequency counts of itemsets using a monitoring tree based on the compressed prefix tree, differently from the estDec method that manages the frequency counts of itemsets using a monitoring lattice based on the prefix tree. Through the monitoring tree, it is possible to reduce the memory usage in the mining process. The estDec+ method comprises four steps: a parameter updating step, a frequency count and node updating step, an itemset insertion step and a frequent itemset selection step.

The compressed prefix tree can cause a merging in all parts of the tree. However, if itemsets adjacent to a minimum support are merged in the process of finding frequent itemsets, an error may be generated in each itemset support due to the errors included in the estimated frequency counts of the itemsets, which can also generate an error in the mining result. That is, frequent itemsets may not be available or itemsets that are not the frequent itemsets may be found as the frequent itemsets.

The estDec+ method that the present invention proposes restricts the range of the itemsets that are objects of merging process in the compressed prefix tree in order to preclude an error in the mining result, even though some errors are allowed to the supports of the respective itemsets in the frequent itemsets obtained as a result of the mining operation. That is, the merging operations are allowed only to the itemsets having a support greater than a fixed threshold. Here, the fixed threshold is defined as a merging threshold and represented by $S_{merge}$. Even if the support difference between a minimum itemset $e_S$ of a parent node and a maximum itemset $e_L$ of a child node is less than $\delta$ in the compressed prefix tree, the two nodes are not merged for the itemsets having a support less than a merging threshold, but maintained separately, thus maintaining the accuracy of the frequency of the corresponding itemsets high. Accordingly, the merging threshold satisfies $S_{min} < S_{merge} < 1$ at all times in the estDec+ method.

If a minimum support $S_{min}$ and a merging threshold $\delta$ are given, let the compressed prefix tree configured by a data stream $D_{k-1}$ be $Q_{k-1}$. If a new transaction $T_k$ is generated over a data stream $D_k$ and a monitoring tree $Q_{k-1}$ based on the compressed prefix tree associated with the data stream $D_k$, the following three steps other than the step of finding frequent itemsets are performed sequentially.

[Step 1] Parameter updating: the total number of transactions is updated to $|D|_k = |D|_{k-1} + 1$ (301).

Figure 3A:
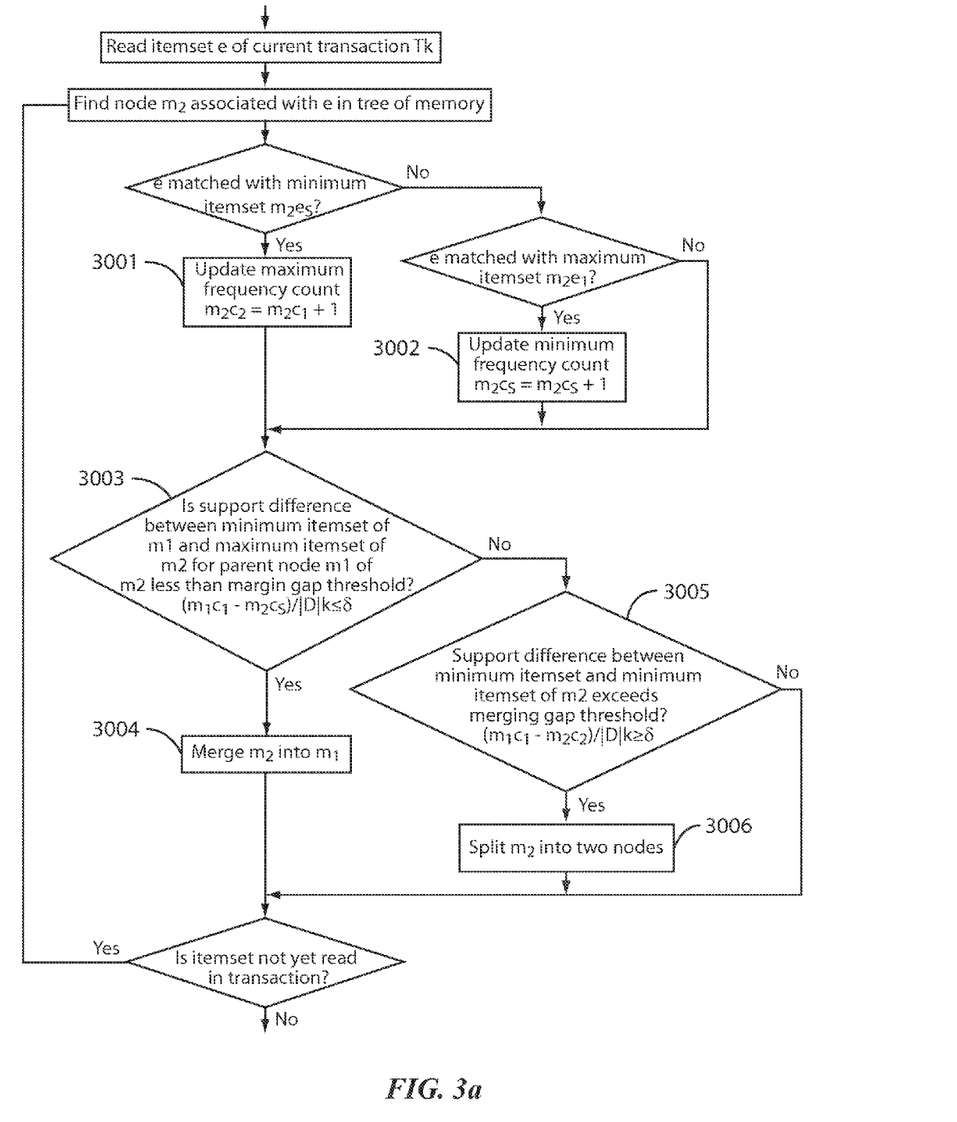
FIG. 3a is a flowchart for illustrating the step of updating the frequency counts of itemsets that appear in transactions when updating the compressed prefix tree, and merging or splitting nodes constituting the tree.

[Step 2] Frequency count and node updating: the frequency count of a node influenced by the respective itemsets that appear in a transaction $T_k$ composed of items aligned in the alphabetic order is updated (302). If a new transaction $T_k$ is generated, nodes of $Q_{k-1}$ denoting itemsets that appear in $T_k$ are found by a depth first finding method. If a $j^{th}$ item of an item list T of a node m is i and j is not an entry of a parent item list TT, that is, if m·T[j]=i and j ≠ m·T[l] ($\Box$/, $1 \leq l \leq |T|$), an item i is defined as a leaf-level item. If $m_p$ is a parent node of a node m and $i_p$ is a leaf-level item generated in the process of finding items of the transaction $T_k$ to update the frequency count, an item $i_q$(p <q$\leq|T|_k$), not yet matched, of $T_k$, is compared whether m·TT[1]=$m_p$·$i_p$ and m·T[1]=$i_p$. If m·T[1]≠$i_q$, the process of finding the node m is terminated and returned to the parent node $m_p$ of m. On the contrary, if m·T[1]=$i_q$, m·$c_L$ is increased by 1 (3001). Let a common item matched with m·T[1] be $ci_1$ and the subsequent match item be $ci_2$, entries of m·T other than m·T[1] are compared with $ci_2$. At the same time, $ci_1$ is compared whether it is a parent item of $ci_2$ at m·T. That is, if $ci_1$ and $ci_2$ have item list indexes of $j_1$ and $j_2$ at m·T, they are compared whether m·TT[$j_2$]=m·$j_1$. Through this finding method, $Q_k$ is searched reflexively to match the remaining items of $T_k$ at m·T. and, if the match items are matched with m·T[|T|], m·$c_S$ is increased by 1 (3002). Through this process, the nodes of the compressed prefix tree accurately manage the frequency count of the minimum itemset and that of the maximum itemset. If the current match item is matched with the leaf-level item of m·T, it moves to a child node of m to compare the subsequent match item of $T_k$ and performs the process of matching with the item list of the corresponding node. This process is terminated if there is no match item.

Figure 1:
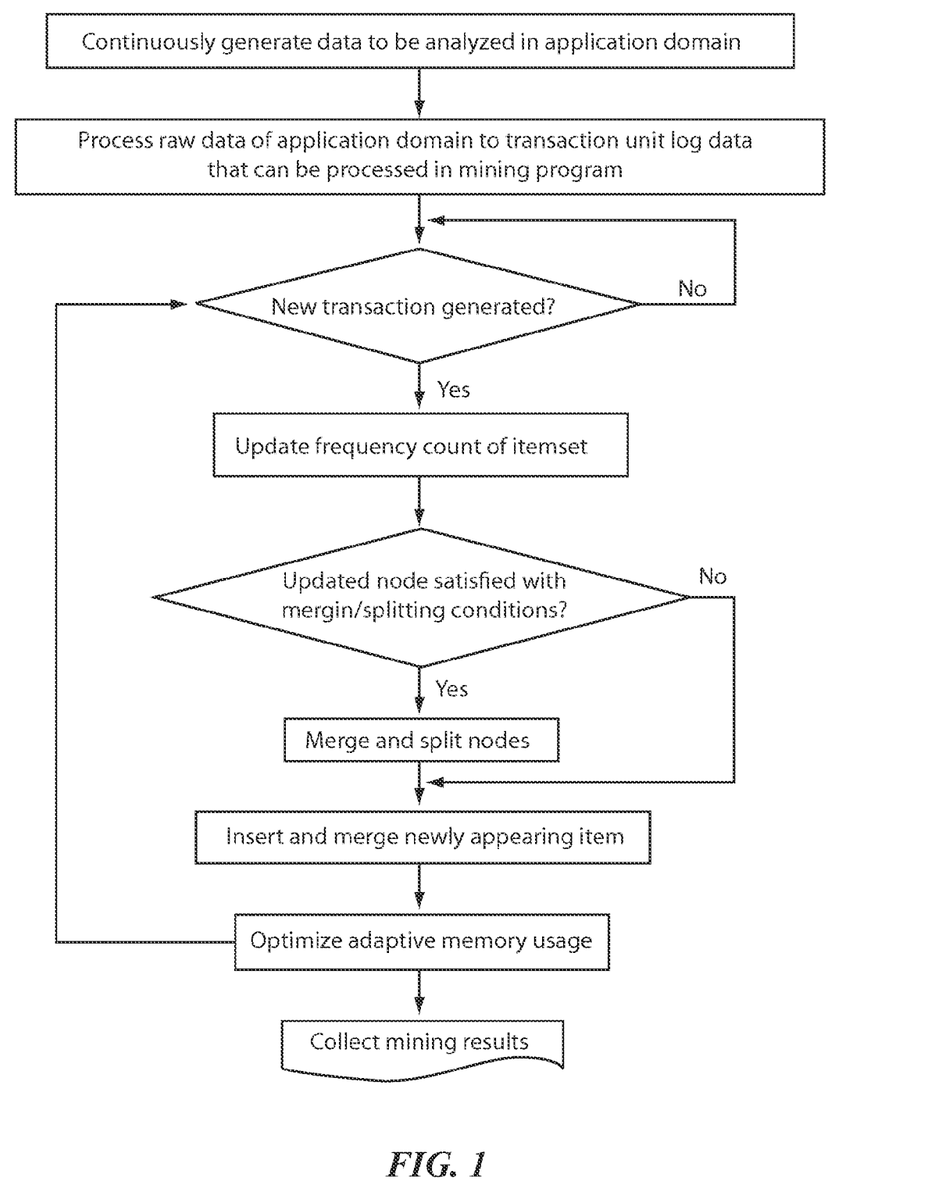
FIG. 1 is a flowchart illustrating an high level structure for finding frequent itemsets using a compressed prefix tree over a data stream in accordance with the present invention.

If a new transaction $T_{11}$={a, c, d} is generated in the compressed prefix tree $Q_k$ of FIG. 1, the first entry of an item list of $m_1$ is compared whether $m_1$·T[1]=a. Since $m_1$·T[1]=a, $m_1$·$c_L$ is increased by 1. Since a of $T_{11}$ matched, the subsequent item c is compared in entries other than a of $m_1$·T whether there is an entry that satisfies $m_1$·T[j]=c and $m_1$·TT[j]=$m_1$·1 ($2 \leq j \leq |m_1$·T|). Since m·T[3]=c and m·TT[3]=$m_1$·1, $m_1$·$C_S$ is increased by 1. Moreover, since m·T[3]=c is a leaf-level item, the match process is terminated at $m_1$ and it moves to the first child node $m_5$ of $m_1$. An item d and a node $m_5$, not yet matched, of $T_{11}$ are compared whether $m_5$·T[1]=d and $m_5$·TT[1]=$m_1$·2. Since $m_5$ satisfies the above conditions and an itemset acd that $m_5$ indicates is a minimum itemset and a maximum itemset of $m_5$ as well, $m_5$·$C_L$ and $m_5$·$C_S$ are increased by 1. After updating the maximum frequency count and the minimum frequency count of $m_5$, it is returned to $m_1$ by the depth first finding method. Since d indicating an itemset ad is not matched with a of $T_{11}$, an entry satisfying $m_1$·T[j]=d and $m_1$·TT[j]=$m_1$·1($2 \leq j \leq |m_1$·T|) is searched. Since there is no entry satisfying the conditions, another child node $m_6$ of $m_1$ is compared whether $m_6$·T[1]=d and $m_6$·TT[1]=$m_1$·1. Since T and TT of $m_6$ satisfy the conditions, the maximum frequency count $m_6$·$C_L$ of $m_6$ and the minimum frequency count $m_6$·$C_S$ of $m_6$ are increased by 1. Through such method, the maximum frequency count and the minimum frequency count of $m_3$ and $m_4$ are updated and the process of updating the frequency counts of itemsets for $T_{11}$ is terminated.

If the maximum frequency count $C_L$ of the corresponding node is less than a significant item support $S_{sig}$, the corresponding itemset (i.e., a node associated with the corresponding itemset) is pruned from the monitoring tree. While a delayed insertion threshold $S_{ins}$ and a pruning threshold $S_{prn}$ are defined separately in the estDec method, the two thresholds are unified and defined as a significant item support $S_{sig}$, and the itemsets, of which the current supports are greater than the $S_{sig}$, are defined as the significant itemsets in the estDec+ method. The delayed insertion and pruning operations are carried out based on the significant item support $S_{sig}$. The itemsets, not pruned, are subjected to node merging (303) or splitting (304) operations are performed by considering the total number of the transactions and the variation of the frequency counts of nodes.

(□) Node merging (3004): A node merging operation may be applied to the following two cases. One is directed to the case where the support difference between a node $m_2$ indicating an itemset that newly appears in $T_k$ and its parent node $m_1$ is less than a merging gap threshold δ. The other is directed to the case where the difference between any node $m_2$ existing in the compressed prefix tree and its parent node $m_1$ is not changed, whereas, the total number of transactions $|D|_k$ is increased and thereby the support difference between two nodes becomes smaller than δ. Here, the frequency count of the node $m_1$ used for calculating the support difference between the two nodes uses the minimum itemset frequency count $m_1 \cdot C_L$ and the frequency count of its child node $m_2$ uses the maximum itemset frequency count $m_2 \cdot C_S$ (3003).

(□) Node splitting (3006): Any node $m_1$ of the compressed prefix tree is split into two nodes, if the support difference between $m_1 \cdot C_S$ and $m_1 \cdot C_L$ is greater than δ, that is, if $(m_1 \cdot C_L - m_1 \cdot C_S)/|D|_k > \delta$ (3005). If $m_1 \cdot C_L$ is increased, the difference in the frequency counts managed by $m_1 \cdot C_S$ and $m_1 \cdot C_S$ is increased and, if the support difference between the two frequency counts is greater than δ, the node is separately split.

[Step 3] Itemset insertion: itemsets, not managed by the monitoring tree, in the itemsets that appear in a transaction $T_k$ are newly inserted into the monitoring tree. The itemset of 1 in length among the itemsets that are objects of insertion is immediately inserted into the first level of the monitoring tree, not passing through the process of estimating the frequency count. Here, the minor itemset having a support of $S_{sig}$ or less is removed from the itemsets that appear in the corresponding transaction to generate a filtered transaction T⁎ and all subsequent operations are performed over the filtered transaction T⁎.

For the items of 2 in length, only itemsets that are likely to become frequent itemsets in the near future are inserted into a monitoring lattice. That is, the frequency counts of the itemsets to be inserted are estimated according to a method to be described in section 4 below, and only the significant itemset, of which estimated supports are greater than the significant item support $S_{sig}$, is inserted. That is, a node indicating the corresponding itemset is generated (305). Like the first case of the node merging, if the difference between the support of an itemset to be inserted and that of an itemset that its parent node indicates is within a merging gap threshold δ, the itemset is merged into the parent node (306).

[Step 4] Maximum frequent itemset selection: this step is performed only to obtain the maximum frequent itemset at the current point of time and a mining result is obtained by sequentially searching the monitoring lattice. For the itemsets merged and managed in the process of finding the monitoring tree, the frequency counts of all itemsets merged into the corresponding node are estimated and the maximum frequent itemset is determined using the same (307).

4. Frequency Count Estimation of a New Itemset.

The compressed prefix tree that is an itemset monitoring structure of the estDec+ method manages only the itemsets having a support greater than $S_{sig}$, like the estDec method. Accordingly, to determine whether a newly generated itemset is inserted in the compressed prefix tree of, the current frequency count of the corresponding itemset is estimated from the subitemsets of the corresponding itemset. Here, if the subitemsets are merged and exist, the frequency counts of the corresponding subitemsets are obtained through the frequency count estimation method as described above. If at least one subitemset does not exist in the monitoring lattice, the corresponding itemset does not estimate the frequency count. Since it is obvious that the estimated frequency count of the corresponding itemset will not be greater than $S_{sig}$, if a portion of the subitemsets is not managed in the current monitoring lattice, it is possible to judge that the corresponding itemset does not need to be inserted into the monitoring lattice, even if the frequency count estimation process does not proceed any longer. If all subitemsets exist in the monitoring lattice, the possible maximum and minimum values of the frequency counts are estimated through the frequency count estimation step. If the maximum value of the frequency count obtained is greater than or equal to $S_{sig}$, the corresponding itemset is inserted into the monitoring lattice to start monitoring. If a portion of subitemsets does not exist, or if the maximum value of the estimated frequency count is smaller than the delayed insertion threshold, it is judged that the corresponding itemset cannot be inserted.

Let the itemset, of which frequency count is to be estimated, be e, the possible maximum and minimum values of the frequency counts are estimated as follows. First, for estimating the frequency counts, a set of subitemsets of e, a set of m-subitemsets and a set of frequency counts of the m-subitemsets are defined as follows:

(□) All itemsets that can be composed of items constituting an itemset e is a set of subitemsets of e and expressed as follows:

$$P(e) = \{\alpha | \alpha \square (2^e - \{e\}) \text{ and all } \alpha \text{ satisfying } \alpha \neq \emptyset\}$$

(□) The itemset composed of m items among the itemsets belonging to P(e), that is, a set of itemsets of m in length is a set of m-subitemsets and represented as follows:

$$P_m(e) = \{\alpha | \alpha \square P(e) \text{ and all } \alpha \text{ satisfying } |\alpha| = m\}$$

(□) A set of the frequency counts of the itemsets belonging to $P_m(e)$, the set being composed of frequency counts different from each other, is a set of the frequency counts of m-subitemsets and denoted as follows:

$$P_m{}^c(e) = \{C_k(e) | \text{ all } \alpha \text{ satisfying } \alpha \square P_m(e)\}$$

Meanwhile, if two itemsets $e_1$ and $e_2$ are given, a merged itemset $e_1 \square e_2$ and a common itemset $e_1 \cap e_2$ are defined as follows.

(□) The merged itemset $e_1 \square e_2$ is an itemset composed of all items belonging to $e_1$ or $e_2$.

(□) The common itemset $e_1 \cap e_2$ is an itemset composed of all items belonging to all $e_1$ and $e_2$.

Here, the respective subitemsets have at least a frequency count as much as the frequency counts of the corresponding item for an itemset. For example, if all items constituting an itemset appear at the same time always, the corresponding itemset has the same frequency count as the subitemsets of the corresponding itemset. Accordingly, the frequency count of the itemset is influenced by the fact how frequent the items constituting an itemset appear at the same time. In consideration of this analysis result, two definite distributions that determine the frequency count of the itemset will be defined as follows. First, as to any two items that appear in a data set composed of a plurality of transactions, if these two itemsets appear together in transactions as much as possible, it is called a minimum exclusive distribution. Next, if these two itemsets appear exclusively, it is called a maximum exclusive distribution. For example, let the numbers of the transactions, in which two itemsets $e_1$ and $e_2$ appear, in a data set composed of 10 transactions be 6 and 7 respectively, if they appear in the merged itemset form in all possible transactions (i.e., the number of the frequency count of the merged itemset is 6), these two itemsets may be in the minimum exclusive distribution. Meanwhile, if the merged itemset appears only in three transactions, these two itemsets may be in the maximum exclusive distribution.

If the two itemsets $e_1$ and $e_2$ are in the minimum exclusive distribution and the maximum exclusive distribution, the frequency count of the merged itemset $e_1 \Box e_2$ can be obtained as follows. First, let a data set composed of transactions be D. Here, |D| denotes the total number of the transactions included in the data set. Moreover, TS(e) denotes a set of all transactions, in which an itemset e appears in the data set, and C(e) denotes the total number of the transactions belonging to TS(e). Here, the following equation for the two itemsets $e_1$ and $e_2$ is obtained by the definition of the merged itemset:

$$TS(e_1 \Box e_2) = TS(e_1) \cap TS(e_2)$$

If the two itemsets are in the minimum exclusive distribution, the following relationship can be made: $TS(e_1) \Box TS(e_2)$ or $TS(e_1) \Box TS(e_2)$. Accordingly, $TS(e_1 \Box e_2)$ becomes an identical set with $TS(e_1)$ or $TS(e_2)$.

Accordingly, $C(e_1 \Box e_2)$ has the same value as the minimum value out of the frequency counts $C(e_1)$ and $C(e_2)$ of the two itemsets. That is, the following relationship is given:

$$C(e_1 \Box e_2) = \min(C(e_1), C(e_2))$$

Meanwhile, min(V) is a function for obtaining a minimum value from the values included in a set V of the numeral values. Here, if a common itemset $e_1 \cap e_2$ of the two itemsets exists, the following equation is found:

$$TS(e_1 \cap e_2) = TS(e_1) \Box TS(e_2)$$

Here, it can be learned from the process of calculating the number of elements of a set that the following equation is made:

$$C(e_1 \cap e_2) = C(e_1) + C(e_2) - C(e_1 \Box e_2), \text{ i.e., } C(e_1 \Box e_2) = C(e_1) + C(e_2) - C(e_1 \cap e_2)$$

If $e_1 \cap e_2$ does not exist, the frequency count of the merged itemset of the two itemsets can be obtained by considering the total number of the transactions constituting the data set. Since $TS(e_1)$ and $TS(e_2)$ are subsets of the data set D, the following relationship is given:

$$TS(e_1) \Box TS(e_2) \Box D$$

Here, it can be understood that the following equation is made by considering the number of elements of a set:

$$C(e_1) + C(e_2) - C(e_1 \Box e_2) \leq |D|, \text{ i.e., } C(e_1) + C(e_2) - |D| \leq C(e_1 \Box e_2)$$

If the sum total of the frequency counts $C(e_1)$ and $C(e_2)$ of the two itemsets is smaller than the total number of the transactions |D| of the whole data set, $C(e_1 \Box e_2)$ may have a value smaller than 0. However, since $C(e_1 \Box e_2)$ is an actual frequency count of the itemset, it should have a value greater than 0. If the two items are in the maximum exclusive distribution, the smallest value is taken out of the values that the merged itemset composed of the two itemsets can take and the following equation can be obtained:

$$C(e_1 \cup e_2) = \begin{cases} C(e_1) + C(e_2) - C(e_1 \cap e_2) & e_1 \cap e_2 \neq \phi \\ \max(0, C(e_1) + C(e_2) - |D|) & e_1 \cap e_2 = \phi \end{cases}$$

Here, max(V) is a function for obtaining a maximum value from the values included in the set V of the numeral values.

If the two itemsets is in the minimum exclusive distribution, the frequency count of the merged itemset has the maximum value. On the contrary, if the two itemsets is in the maximum exclusive distribution, the frequency count of the merged itemset has the minimum value. That is, the frequency count of the merged itemset has a value greater than the frequency count in case of the maximum exclusive distribution and a value smaller than the frequency count in case of the minimum exclusive distribution As describe above, the frequency counts for the itemsets to be subjected to the delayed insertion can be obtained from the frequency counts of the subitemsets of the corresponding itemset. Here, the possible minimum frequency count and the maximum frequency count are all obtained. In the following description of the present invention, the minimum possible frequency count $C^{min}(e)$ and the maximum possible frequency count $C^{max}(e)$ denote the possible minimum frequency count and maximum frequency count of the itemset e. The maximum possible frequency counts of the itemsets are obtained by assuming the case where all subitemsets are in the minimum exclusive distribution. That is, the frequency counts are obtained by assuming that the subitemsets appear in the transactions as much as possible at the same time. In an itemset e, if two subitemsets $\alpha_i$ and $\alpha_j$ of the corresponding itemset are in the minimum exclusive distribution, the frequency count of their merged itemset (i.e., the same as the itemset e) is obtained as $\min(C(\alpha_i), C(\alpha_j))$ as described above. Accordingly, if all subitemsets of the corresponding itemset is in the minimum exclusive distribution, the maximum possible frequency count $C^{max}(e)$ of the itemset e can be defined as the minimum value out of the frequency counts of all subitemsets. However, the subitemset of the maximum length out of all subitemsets has the smallest frequency count. Accordingly, $C^{max}(e)$ can be obtained by considering the frequency counts of (n−1)-subitemsets only. That is, if (n−1)-subitemset $P_{n-1}(e)$ is not an empty set for the itemset e, the maximum possible frequency count $C^{max}(e)$ is obtained as follows:

$$C^{max}(e) = \min(P_{n-1}^c(e))$$

Also, the minimum possible frequency count $C^{min}(e)$ of the itemset e can be obtained from the frequency counts of all subitemsets or from the frequency counts of (n−1)-subitemsets. However, it is obtained by considering the case where the corresponding subitemsets are in the maximum exclusive distribution. For the respective combinations composed of two (n−1)-subitemsets $\alpha_i$ and $\alpha_j$ different from each other, if the two subitemsets are in the maximum exclusive distribution, the minimum possible frequency count $C^{min}(e)$ can be obtained as described above. Here, the maximum value out of the minimum possible frequency counts obtained from all combinations may be the minimum possible frequency count of the itemset e. That is, if (n−1)-subitemset $P_{n-1}(e)$ is not an empty set and they are in the maximum exclusive distribution, the minimum possible frequency count is obtained as follows:

$$C^{min}(e) = \max(\{C(\alpha_i \Box \alpha_j) | \alpha_i, \alpha_j \Box P_{n-1}(e) \text{ and all } \alpha_i \text{ and } \alpha_j \text{ satisfying } i \neq j\})$$

$C^{max}(e)$ is designated as an actual frequency count of the corresponding item for the itemset e. However, since $C^{max}(e)$ is a value obtained by an estimation, the frequency counts of the respective itemsets have errors due to the estimation. Here, the difference between the maximum possible frequency count and the minimum possible frequency count is called the estimation error $\epsilon(e)$, which indicates the maximum error that may be generated by the frequency count estimation. The frequency counts as much as they are regarded as the frequency count estimation errors are fixed to a value at the point of time when estimating the frequency count of the corresponding item; however, the total number of the transactions is increased with the addition of new transactions and thereby the support difference due to the estimation errors becomes very small. Accordingly, the frequency count of the inserted item by the delayed insertion has an error that can be disregarded after a lapse of a predetermined time period. That is, a reliable mining result can be obtained.

5. Adaptive Memory Usage Optimization Using Compressed Prefix Tree

Figure 4:
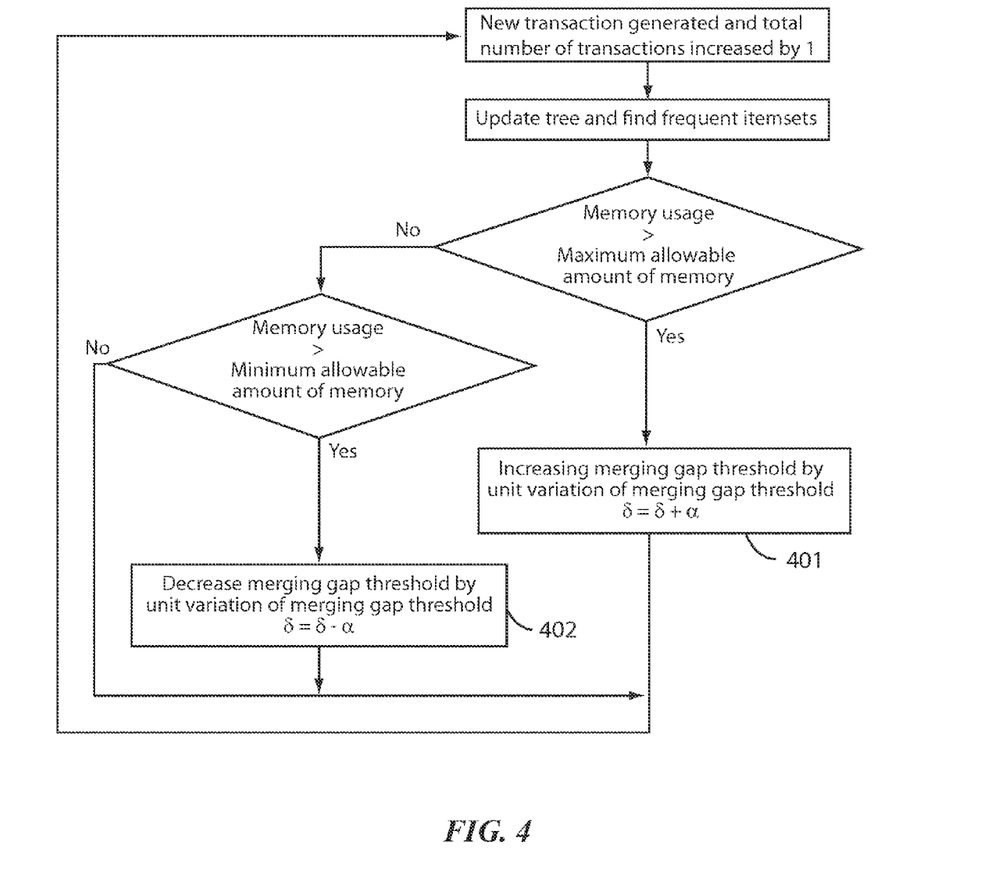
FIG. 4 is a flowchart for illustrating the step of optimizing an adaptive memory usage using a compressed prefix tree.

FIG. 4 shows is the process of optimizing an adaptive memory usage using a compressed prefix tree. The memory usage in the mining process is reduced by using a compress prefix tree in the process of finding frequent itemsets over a data stream. However, since the data stream must be varied as time goes by, the number of significant itemsets that should be maintained in the monitoring tree may be varied. Accordingly, to efficiently perform the mining operation over a data stream in a limited memory space, it is necessary to dynamically adapt the memory usage required during the mining process to the variation of the data stream. The tree size in the compressed prefix tree is influenced by a merging gap threshold $\delta$. That is, if the merging gap threshold $\delta$ is set large, the ratio of merged nodes is increased and the tree size is decreased, thus reducing the memory usage in the mining process. However, it has a drawback in that the accuracy of the mining result may be lowered if the merging gap threshold $\delta$ is set great. Accordingly, even if an available memory space for finding frequent itemsets over a data stream is given definitely, it is possible to obtain an optimum mining result under the given circumstances, not exceeding the limited range, but making the most use of it. For this purpose, in the estDec+ method, the merging gap threshold of the compressed prefix tree is dynamically adjusted in consideration of the variation of the data stream, thus obtaining optimum mining results, which is called an adaptive estDec+ method.

If the merging gap threshold is varied from $\delta^{old}$ to $\delta^{new}$ over a data stream $D_k$ and over a compressed prefix tree associated with the same, the new merging gap threshold $\delta^{new}$ is applied only to the nodes found by newly generated transactions after the variation of the merging gap threshold in the compressed prefix tree. In this case, the merged nodes, not found by the new transactions, may exist as merged under the different conditions from the varied merging gap threshold $\delta^{new}$. To prevent this problem, all nodes of the compressed prefix tree are searched at every time when the merging gap threshold is varied to update the respective nodes by applying the new merging gap threshold thereto, which, however, increases the processing time. Accordingly, in the adaptive estDec+ method, the updated merging gap threshold is applied only to the nodes found by newly generated transactions, even if the merging gap threshold is varied, thus reducing the processing time suitably for the online data stream process.

When finding frequent itemsets over online data streams through the adaptive estDec+ method, the merging gap threshold is varied by comparing the available memory space and the current memory space. The adaptive variation process of the merging gap threshold $\delta$ is carried out in the parameter updating step. If the memory usage, the maximum allowable amount of memory, the minimum allowable amount of memory and the size of available memory used in the current compressed prefix tree are denoted by $M_C$, $M_U$, $M_L$ and $M_A$ respectively, the new merging gap threshold $\delta^{new}$ is updated from $\delta^{old}$ as follows:

$$\delta^{new} = \begin{cases} \delta^{old} + \alpha (\text{if } M_C > M_U) \\ \delta^{old} - \alpha (\text{if } M_C < M_L) \end{cases} (M_A > M_U > M_L > 0)$$

In the above equation, $\alpha$ denotes a unit variation of $\delta$ according to the memory adapting process and is defined by a user. If the current memory usage $M_C$ exceeds the maximum allowable amount of memory $M_U$ by the compressed prefix tree, $\delta$ is increased to increase the number of nodes to be merged and reduce the size of the compressed prefix tree (401), thus reducing the memory usage. On the contrary, if $M_C$ is less than the minimum allowable amount of memory $M_L$, $\delta$ is reduced to increase the size of the compressed prefix tree (402). Accordingly, the memory usage is adjusted to be the maximum within the range of the available memory, thus reducing errors of the frequent itemsets caused by the increase of $\delta$.

In finding frequent itemsets over a data stream that is an indefinite data set continuously increased, an important consideration is to efficiently manage the frequency counts of items generated in the corresponding data stream. Particularly, in an online data stream, an important requirement is to promptly obtain a mining result at a certain point of time from the corresponding data stream in a given memory. To meet these requirements, an estDec method has been proposed, in which, however, it is difficult to ensure that the memory usage for managing the frequency counts of itemsets that appear in the data stream during the mining process will is maintained at all times within the available memory. To solve such drawbacks, the present invention provides an estDec+ method along with a compressed prefix tree.

Differently from the prefix tree in which each itemset is expressed in a single node, the compressed prefix tree merges nodes into a node if a support difference between adjacent nodes in the prefix tree is less than a merging gap threshold $\delta$ to express many itemsets in a single node, thus reducing the memory usage required for the mining process. The estDec+ method for finding frequent itemsets over a data stream sets a merging threshold $S_{merge}$ high to preclude itemsets having a support similar to a minimum support from merging objects, thus minimizing the memory usage and, at the same time, managing the frequency counts of frequent itemsets accurately. The estDec+ method can obtain a mining result efficiently even if the available memory space is restricted to a very small range by dynamically adjusting the merging gap threshold $\delta$ of the compressed prefix tree to meet the variation of information generated in the data stream. Moreover, it is possible to maintain the accuracy of the mining result high by making the most use of the given memory space through the dynamic adjustment of the merging gap threshold.

What is claimed is:

1. A method for finding frequent itemsets using a compressed prefix tree in a restricted memory space, the method comprising steps of:
- updating parameters about finding the frequent itemsets comprising a total number of transactions when a new transaction appears;
- updating a frequency count of an itemset that appears in the new transaction about a transaction monitored by the compressed prefix tree through searching the compressed prefix tree;
- inserting or pruning the itemsets in the compressed prefix tree among the itemsets not monitored by the compressed prefix tree considering a support and a length of the itemset;
- merging or splitting nodes corresponding to respective itemsets which are monitored using the undated frequency count in the compressed prefix tree; and
- finding frequent itemsets among itemsets monitored by the compressed prefix tree.

2. The method for finding frequent itemsets as recited in claim 1,
wherein the nodes of the compressed prefix tree comprises four entries including an item list, a parent item list, a maximum frequency count that is a frequency count of a minimum itemset that the first item of the item list indicates, and a minimum frequency count that is a frequency count of a maximum itemset that the last item of the item list indicates.

3. The method of finding frequent itemsets as recited in claim 2, wherein the updated frequency count of an itemset in the updating step is the maximum frequency count and the minimum frequency of the node including the itemsets that appear in the new transaction.

4. The method for finding frequent itemsets as recited in claim 3,
wherein the merging or splitting nodes step further comprises the steps of:
- merging two independent nodes, if a support difference is less than a predefined merging gap threshold, to update a frequency count of an itemset in a newly generated transaction in a data stream; and
- splitting nodes, if a support difference in a plurality of itemsets managed in a single node exceeds the merging gap threshold.

5. The method for finding frequent itemsets as recited in claim 4,
wherein the step of splitting nodes further comprises the step of estimating a frequency count of an itemset other than a minimum itemset and a maximum itemset, if a node indicates at least three different itemsets, using a maximum frequency count, a minimum frequency count and an estimation function based on a relationship between a variation of the frequency count and a length of the itemset.

6. The method of finding frequent itemsets as recited in claim 4, wherein in the merging nodes step, if one of supports of the merged nodes is less than a predefined merging threshold, though the support difference is less than the predefined merging gap, the merged nodes is precluded from merging.

7. The method of finding frequent itemsets as recited in claim 4, wherein the merging gap threshold is adjusted by comparing an allowable memory space and the current memory space.

* * * * *